(12) United States Patent
Hain et al.

(10) Patent No.: US 6,346,882 B1
(45) Date of Patent: Feb. 12, 2002

(54) SWITCHGEAR CABINET MONITORING ARRANGEMENT

(75) Inventors: Markus Hain, Dillenburg; Michael Seelbach, Freudenberg, both of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/524,645

(22) Filed: Mar. 13, 2000

(30) Foreign Application Priority Data

Mar. 31, 2000 (DE) .......................................... 199 11 249

(51) Int. Cl.[7] .............................................. G08B 19/00
(52) U.S. Cl. .................... 340/521; 340/506; 340/825.06
(58) Field of Search ................................. 340/506, 511, 340/517, 521, 825.06

(56) References Cited

U.S. PATENT DOCUMENTS 6,060,994 A * 5/2000 Chen ..................... 340/825.06

FOREIGN PATENT DOCUMENTS

DE 196 09 689 9/1997

* cited by examiner

*Primary Examiner*—Daryl Pope
(74) *Attorney, Agent, or Firm*—Pauley Petersen Kinne & Fejer

(57) ABSTRACT

A switchgear cabinet monitoring arrangement with a monitoring unit (ÜE) having a control device (ST), an indicator control and inputs for connecting sensors, outputs for connecting actuators, and a programming unit which is or can be connected with the monitoring unit, and with an indicator device. An improved adaptation to various uses of the switchgear cabinet is achieved because visual and/or acoustical notices for the distribution via the indicator device can be provided and changed by the programming unit and can be transmitted to the monitoring unit and stored in a memory device. As a function of the switchgear states detected via the sensors, the notices can be transmitted by the control device to the indicator device and can be displayed on the indicator device.

8 Claims, 2 Drawing Sheets

SWITCHGEAR CABINET MONITORING ARRANGEMENT

BACKGROUND OF THE INVENTION

1. Field of the Invention

This invention relates to a switchgear cabinet monitoring arrangement with a monitoring unit having a control device with an indicator control, inputs for connecting sensors, outputs for connecting actuators, and a programming unit which is or can be connected with the monitoring unit, and with an indicator device.

2. Description of Prior Art

A switchgear cabinet monitoring arrangement of this type is disclosed in German Patent Reference DE 196 09 689 A1. In this known switchgear cabinet monitoring arrangement a monitoring unit has several inputs for sensors, for example, temperature sensors, a smoke sensor, a vibration sensor, a humidity sensor and a door position switch, as well as several outputs for triggering actuators. As a function of sensor signals, indicator units of an indicator device can be triggered by a control device in the monitoring device to output corresponding notices. A control station can also be connected to the monitoring device via an appropriate output. The switchgear cabinet can be monitored by this monitoring device for many types of functions, and can be controlled as a function of the sensor signals. For monitoring, appropriate notices are assigned to the most important switchgear cabinet states for the information of the user.

SUMMARY OF THE INVENTION

One object of this invention is to provide a switchgear cabinet monitoring arrangement with monitoring possibilities that are improved.

This object is achieved with a switchgear monitoring arrangement as set forth in this specification and in the claims. Visual and/or acoustical notices for the distribution via the indicator device can be provided and changed by the programming unit and can be transmitted to the monitoring unit and stored in a memory device. As a function of the switchgear states detected via the sensors, the notices can be transmitted by the control device to the indicator device and can be displayed on the indicator device.

Adapted to the respective employment of the switchgear cabinet, it is possible by these steps to provide more accurate information regarding the state of the switchgear to the operator, wherein the adaptation can easily be performed by the programming unit and the design of the monitoring unit in accordance with the respective requirements.

The indicator unit can be connected to the monitoring unit via at least one output. Notices can be assigned to the at least one output by the control device. Thus, it is not only possible to select a suitable indicator device, for example with visual or acoustic alarm emitters, but the respective type of signaling, for example the loudness, pitch, symbols size, color, contrast, intermittent indicating mode, and the like can be easily set.

The variable output of the notices is favored because the notices can be assigned to the respective outputs by the programming unit. The assignments can be stored in the memory device of the monitoring unit and can be changed by the programming unit.

In one advantageous embodiment of this invention, alarm emitters of the indicator device for different alarm notices are connected to different outputs, to which the associated notices can be delivered.

The association between sensor signals and notices is further simplified and can also be later adapted to the different conditions because the monitoring unit has a linkage device with which connections between the inputs and the outputs are set in accordance with a preselection by the programming unit and can be changed by the programming unit.

The signaling options are favored because the linkage device has different linkage members, which can be diagrammatically represented on a screen of the programming unit together with the inputs and the outputs, and with the connections, and can be installed in the connections. The inputs and the outputs can be occupied by selectable indicating symbols on the screen, and the linkage of the inputs and the outputs, as well as the prepared notices with their associations can be transmitted as a configuration data set to and stored in the monitoring data set.

BRIEF DESCRIPTION OF THE DRAWINGS

This invention will be explained in greater detail by an exemplary embodiment, making reference to the drawings, wherein.

DESCRIPTION OF PREFERRED EMBODIMENTS

Figure 1:
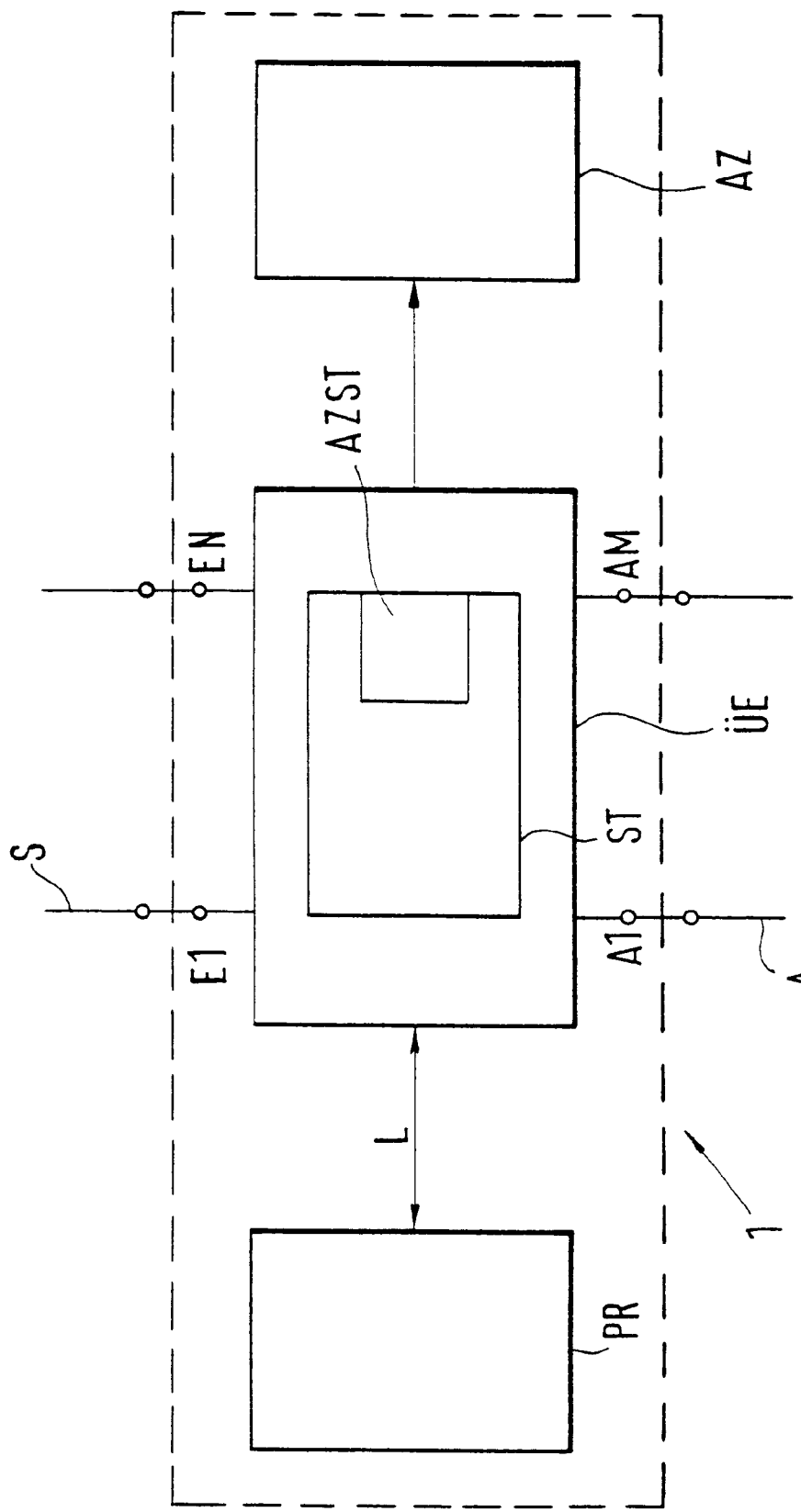
FIG. 1 represents a block diagram of a switchgear cabinet monitoring arrangement.

FIG. 1 shows a switchgear cabinet monitoring arrangement 1 with a monitoring unit ÜE, a programming unit PR and an indicator unit AZ. The monitoring unit ÜE has several inputs E1 to EN for the connection of sensors S, and several outputs A1 to AM for the connection of actuators A, wherein the number of inputs E1 to EN and outputs A1 to AM can be different. A control device ST with an indicator control AZST is provided in the monitoring unit ÜE. The programming unit PR is bidirectionally connected with the monitoring unit ÜE via a line L, for example a bus connection or a network line, which can also be designed to be wireless, and is connected with the indicator device AZ for issuing acoustical or visual notices. The indicator device AZ can have different alarm emitters and other indicator elements, which can also be connected through the outputs A1 to AM.

The indicator unit AZ can also be arranged spatially separated from the monitoring unit ÜE and connected with the monitoring unit ÜE through a network, for example.

Figure 2:
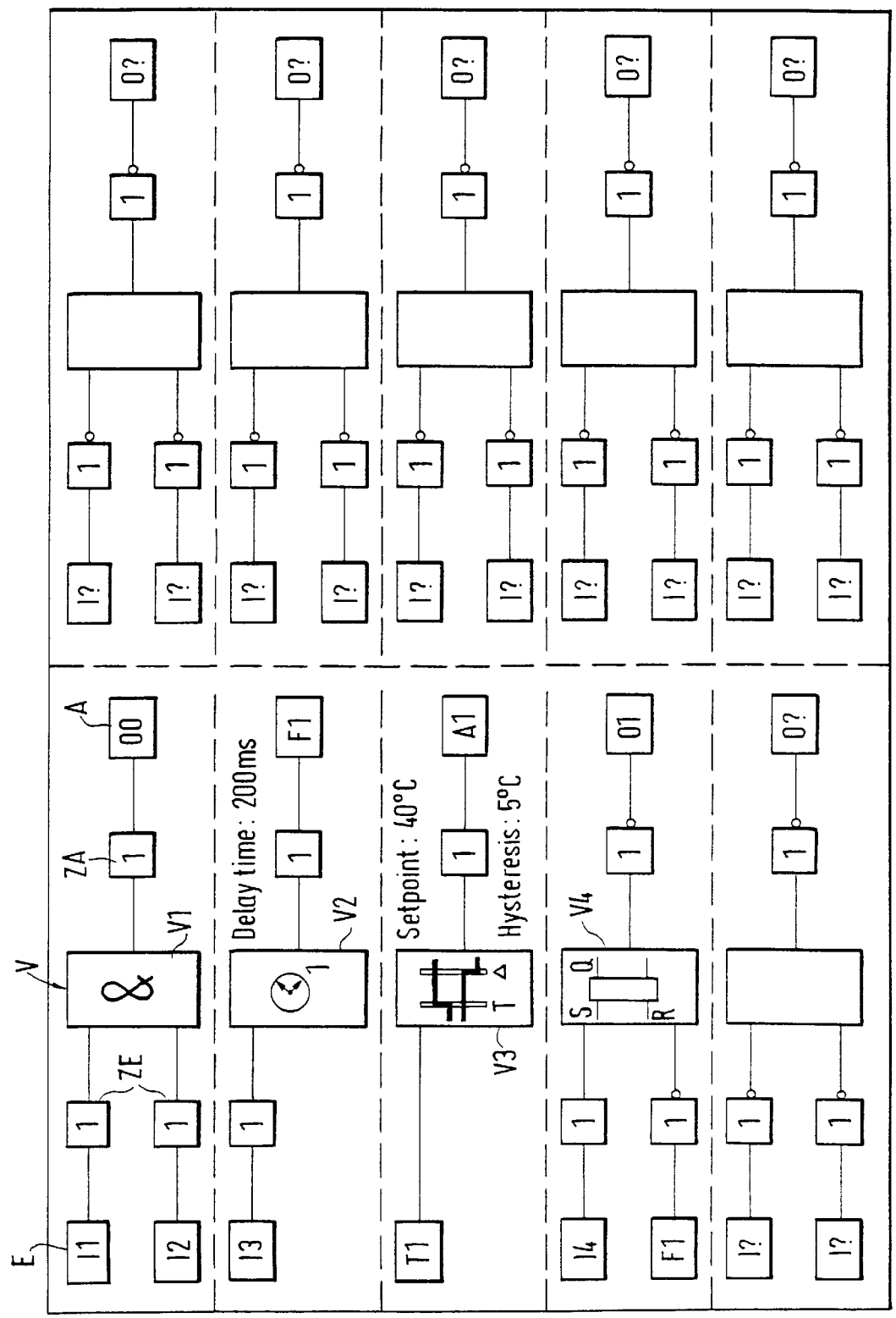
FIG. 2 represents one embodiment of linkage options on a programming unit represented in FIG. 1.

The monitoring unit ÜE also has a linkage device, by means of which the inputs E1 to EN can be selectively connected with the outputs A1 to AM. The connections can be made and changed by means of the programming unit PR, wherein different linkage options are diagrammatically represented on a screen of the programming unit PR, as shown in FIG. 2. For example, in FIG. 2 two inputs E with the identification I1, I2 are connected with an output A with the identification OO via intermediate input members ZE, a linkage member V in the form of an AND member V1 and an intermediate output member ZA. An input E with the identification I3 is connected with an output with the identification F1 via an intermediate input member, a timer V2 in the form of a delay circuit and an intermediate output member ZA. A further input E with the identification T1 is connected with a further output with the identification A1 via a hysteresis member V3 and an intermediate output member ZA, while further inputs E with the identification I4 and F1 are connected with an output A with the identification O1 via respective intermediate input members ZE, of which the one assigned to the input with the identification F1 is negated, via a flip-flop V4 and an inverting intermediate output member ZA. Other connecting possibilities are still open and not identified by appropriate symbols. Such linkages of inputs E1 to EN with outputs A1 to AM, made by means of the programming unit PR, are transmitted in the form of a parametrical data set, or respectively configuration data set, via a serial interface or a network corresponding to the line L to the monitoring unit ÜE and stored in a memory unit provided in the latter. For changing the connections, the data set can also be transmitted by the monitoring unit ÜE to the programming unit PR. Various adaptation options to respective use requirements of a switchgear cabinet result by means of the programming unit PR together with the linkage device, which cabinet can therefore be flexibly adapted to different uses without necessarily performing extensive changes in the switchgear cabinet monitoring arrangement 1.

The monitoring unit ÜE, together with the programming unit PR, is designed in such a way that the notices to be transmitted to the user are variable, so that it is possible, for example in case of an exchange of the indicator device or its components, such as the alarm emitters, or in case of a rearrangement of the connections between the inputs E and the outputs A, to also change the notices in a simple manner and to reset them, as well as to store them in the monitoring unit ÜE. In that case the notices, for example loudness, pitch, or a verbal output of the acoustical signal, or respectively size, color, symbols and texts of the visual signals, or respectively in both cases also an intermittent representation, can then be supplied as a function of the sensor signals and while being controlled by the control device ST, or respectively the indicator control AZST, to the respective elements of the indicator device AZ and appropriately assigned. In this way the switchgear cabinet monitoring arrangement 1 makes possible not only a flexible adaptation to different uses, but also an appropriately flexible adaptation of the signals via the indicator elements, such as the alarm emitters, or selectively by means of large-size text displays. A switchgear cabinet monitoring arrangement, which can be varied in a simple manner, is thus obtained.

What is claimed is:

1. In a switchgear cabinet monitoring arrangement (1) with a monitoring unit (ÜE) having a control device (ST), an indicator control (AZST), a plurality of inputs (E, E1 . . . EN) for connecting sensors (S) which monitor the states of the switchgear cabinet, a plurality of outputs (A, A1 . . . AM) for connecting actuators (A), and a programming unit (PR) which can be connected with the monitoring unit (ÜE) and with an indicator device (AZ), the improvement comprising:

at least one of a plurality of visual notices and a plurality of acoustical notices for distribution via the indicator device (AZ) provided and changed by the programming unit (PR) and transmitted to the monitoring unit (ÜE) and stored in a memory device; and as a function of a plurality of switchgear states detected via the sensors (S) the notices being transmitted by means of the control device (ST) to the indicator device (AZ) and being displayed on the indicator device (AZ).

2. In the switchgear cabinet monitoring arrangement in accordance with claim 1, wherein the indicator unit (AZ) is connected to the monitoring unit (ÜE) via at least one output of the outputs (A, A1 . . . AM), and the notices are assigned to the at least one output of the outputs (A, A1 . . . AM) by the control device (ST).

3. In the switchgear cabinet monitoring arrangement in accordance with claim 2, wherein the notices are assigned to the respective outputs by the programming unit (PR), and assignments are stored in the memory device of the monitoring unit (ÜE) and are changed by the programming unit (PR).

4. In the switchgear cabinet monitoring arrangement in accordance with claim 3, wherein a plurality of alarm emitters of the indicator device (AZ) for different alarm notices are connected to the outputs (A, A1 . . . AM) to which the associated notices are delivered.

5. In the switchgear cabinet monitoring arrangement in accordance with claim 4, wherein the monitoring unit (ÜE) has a linkage device (ZE, V, ZA) by which connections between the inputs (E, E1 . . . EN) and the outputs (A, A1 . . . AM) are preset by the programming unit (PR) and are changed by the programming unit (PR).

6. In the switchgear cabinet monitoring arrangement in accordance with claim 5, wherein the linkage device (ZE, V, ZA) has a plurality of linkage members (V1, V2, V3, V4) which can be diagrammatically represented on a screen of the programming unit (PR) together with the inputs (E, E1 . . . EN), the outputs (A, A1 . . . AM) and the connections, and are installed in the connections, the inputs (E, E1 . . . EN) and the outputs (A, A1 . . . AM) are occupied by selectable indicating symbols on the screen, and the linkages of the inputs (E, E1 . . . EN), and the outputs (A, A1 . . . AM), and the prepared notices with the associations are transmitted as a configuration data set to the monitoring data set and stored in the monitoring data set.

7. In the switchgear cabinet monitoring arrangement in accordance with claim 2, wherein a plurality of alarm emitters of the indicator device (AZ) for different alarm notices are connected to the outputs (A, A1 . . . AM) to which the associated notices are delivered.

8. In the switchgear cabinet monitoring arrangement in accordance with claim 1, wherein the monitoring unit (ÜE) has a linkage device (ZE, V, ZA) by which connections between the inputs (E, E1 . . . EN) and the outputs (A, A1 . . . AM) are preset by the programming unit (PR) and are changed by the programming unit (PR).

* * * * *